United States Patent
Cabrera et al.

(10) Patent No.: US 9,467,477 B2
(45) Date of Patent: Oct. 11, 2016

(54) METHOD AND SYSTEM FOR AUTOMATICALLY MANAGING SECRETS IN MULTIPLE DATA SECURITY JURISDICTION ZONES

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 141 days.

(21) Appl. No.: 14/073,110

(22) Filed: Nov. 6, 2013

(65) Prior Publication Data
US 2015/0128207 A1    May 7, 2015

(51) Int. Cl.
| G06F 17/00 | (2006.01) |
| G06F 7/04 | (2006.01) |
| G06F 17/30 | (2006.01) |
| H04L 29/06 | (2006.01) |
| H04N 7/16 | (2011.01) |

(52) U.S. Cl.
CPC ......... *H04L 63/205* (2013.01); *H04L 63/0428* (2013.01); *H04L 63/062* (2013.01); *H04L 63/105* (2013.01); *H04L 63/107* (2013.01); *H04L 63/20* (2013.01)

(58) Field of Classification Search
CPC ... H04L 21/60; H04L 63/20; H04L 63/0428; H04L 63/062; H04L 63/105; H04L 63/107
USPC ...................................... 726/1, 4, 17, 26–30
See application file for complete search history.

(56) References Cited

U.S. PATENT DOCUMENTS

| 5,003,596 A | 3/1991 | Wood |
| 6,157,723 A | 12/2000 | Schultz |
| 6,324,648 B1 | 11/2001 | Grantges, Jr. |
| 6,889,210 B1 * | 5/2005 | Vainstein ............ G06F 21/6209 380/201 |
| 6,981,041 B2 | 12/2005 | Araujo et al. |

(Continued)

FOREIGN PATENT DOCUMENTS

| EP | 0906677 | 1/1998 |
| EP | 2645673 | 10/2013 |

(Continued)

OTHER PUBLICATIONS

Cabrera et al., "Method and System for Distributing Secrets," U.S. Appl. No. 14/053,488, filed Oct. 14, 2013.

(Continued)

*Primary Examiner* — Shewaye Gelagay
*Assistant Examiner* — Trong Nguyen
(74) *Attorney, Agent, or Firm* — Hawley Troxell Ennis & Halwey LLP; Philip McKay

(57) ABSTRACT

Data security jurisdiction zones are identified and data security policy data for the data security jurisdiction zones is obtained. The data security policy data for the data security jurisdiction zones is then automatically analyzed to determine allowed secrets data with respect to each of the identified data security jurisdiction zones. The allowed secrets data with respect to each of the data security jurisdiction zones is then automatically obtained and provided to resources in the respective data security jurisdiction zones, either from a central secrets data store or from an allowed secrets data store associated with each data security jurisdiction zone.

26 Claims, 3 Drawing Sheets

(56) References Cited

U.S. PATENT DOCUMENTS

| | | | |
|---|---|---|---|
| 6,996,716 B1 | 2/2006 | Hsu | |
| 7,178,033 B1 * | 2/2007 | Garcia | G06F 21/10 713/165 |
| 7,336,790 B1 * | 2/2008 | Caronni et al. | 380/277 |
| 7,380,120 B1 | 5/2008 | Garcia | |
| 7,434,045 B1 | 10/2008 | Enderwick et al. | |
| 7,546,629 B2 | 6/2009 | Albert et al. | |
| 7,715,565 B2 | 5/2010 | Kimmel et al. | |
| 7,739,501 B2 | 6/2010 | Kimmel et al. | |
| 7,983,423 B1 | 7/2011 | Agarwal et al. | |
| 8,095,960 B2 | 1/2012 | Boogert et al. | |
| 8,316,237 B1 | 11/2012 | Felsher et al. | |
| 8,352,999 B1 * | 1/2013 | Zhan et al. | 726/1 |
| 8,498,941 B2 | 7/2013 | Felsher | |
| 8,560,857 B2 | 10/2013 | Munetoh et al. | |
| 8,656,189 B2 | 2/2014 | Orsini et al. | |
| 8,700,906 B2 | 4/2014 | Kamara et al. | |
| 8,826,013 B1 | 9/2014 | Kodukula et al. | |
| 8,880,882 B2 | 11/2014 | Kulkarni et al. | |
| 2002/0023065 A1 | 2/2002 | Frelechoux et al. | |
| 2004/0210591 A1 | 10/2004 | Hirschfeld et al. | |
| 2005/0138110 A1 | 6/2005 | Redlich et al. | |
| 2006/0062238 A1 | 3/2006 | Mahendran et al. | |
| 2006/0215839 A1 | 9/2006 | Augenstein et al. | |
| 2006/0291664 A1 | 12/2006 | Suarez et al. | |
| 2007/0156781 A1 | 7/2007 | Kapoor et al. | |
| 2007/0195960 A1 * | 8/2007 | Goldman | H04L 9/30 380/286 |
| 2007/0276931 A1 | 11/2007 | Mahdavi et al. | |
| 2008/0013569 A1 | 1/2008 | Boren | |
| 2008/0072309 A1 | 3/2008 | Kleinsteiber et al. | |
| 2008/0083036 A1 | 4/2008 | Ozzie et al. | |
| 2008/0098392 A1 | 4/2008 | Wipfel et al. | |
| 2008/0109491 A1 | 5/2008 | Gupta | |
| 2008/0319909 A1 | 12/2008 | Perkins et al. | |
| 2009/0092252 A1 | 4/2009 | Noll et al. | |
| 2009/0103724 A1 | 4/2009 | Tamai | |
| 2009/0204631 A1 | 8/2009 | Pomroy et al. | |
| 2009/0287837 A1 | 11/2009 | Felsher | |
| 2010/0082991 A1 | 4/2010 | Baldwin et al. | |
| 2010/0189251 A1 | 7/2010 | Curren | |
| 2011/0004752 A1 | 1/2011 | Shukla | |
| 2011/0022812 A1 | 1/2011 | van der Linden et al. | |
| 2011/0093707 A1 | 4/2011 | Green et al. | |
| 2011/0113236 A1 | 5/2011 | Chenard et al. | |
| 2011/0158406 A1 | 6/2011 | Marcia et al. | |
| 2011/0188651 A1 | 8/2011 | Iswandhi et al. | |
| 2011/0191595 A1 | 8/2011 | Damian et al. | |
| 2011/0219035 A1 | 9/2011 | Korsunsky et al. | |
| 2011/0277027 A1 | 11/2011 | Hayton et al. | |
| 2012/0131189 A1 | 5/2012 | Smart et al. | |
| 2012/0185913 A1 | 7/2012 | Martinez et al. | |
| 2012/0204032 A1 | 8/2012 | Wilkins et al. | |
| 2012/0303776 A1 | 11/2012 | Ferris | |
| 2012/0311564 A1 | 12/2012 | Khalid | |
| 2013/0019284 A1 | 1/2013 | Pacyga et al. | |
| 2013/0060825 A1 | 3/2013 | Farcasiu et al. | |
| 2013/0097706 A1 | 4/2013 | Titonis et al. | |
| 2013/0104213 A1 | 4/2013 | Nandakumar | |
| 2013/0125247 A1 | 5/2013 | Sprague et al. | |
| 2013/0204849 A1 | 8/2013 | Chacko | |
| 2013/0219456 A1 | 8/2013 | Sharma et al. | |
| 2013/0254539 A1 | 9/2013 | Auradkar et al. | |
| 2013/0346558 A1 | 12/2013 | Khalidi et al. | |
| 2014/0007178 A1 | 1/2014 | Gillum et al. | |
| 2014/0007239 A1 | 1/2014 | Sharpe et al. | |
| 2014/0026179 A1 | 1/2014 | Devarajan et al. | |
| 2014/0068732 A1 | 3/2014 | Hinton et al. | |
| 2014/0074637 A1 | 3/2014 | Hammad | |
| 2014/0075499 A1 * | 3/2014 | Arun et al. | 726/1 |
| 2014/0165134 A1 | 6/2014 | Goldschlag et al. | |
| 2014/0244585 A1 | 8/2014 | Sivasubramanian et al. | |
| 2014/0282840 A1 | 9/2014 | Guinan | |
| 2014/0283010 A1 | 9/2014 | Rutkowski et al. | |
| 2014/0330869 A1 | 11/2014 | Factor et al. | |

FOREIGN PATENT DOCUMENTS

| | | |
|---|---|---|
| GB | 2477682 | 11/2009 |
| GB | 2524632 | 1/2015 |
| WO | WO 2010/144735 | 12/2010 |

OTHER PUBLICATIONS

Cabrera et al., "Method and System for Providing a Secure Secrets Proxy," U.S. Appl. No. 14/054,450, filed Oct. 15, 2013.

Weaver et al., "Method and System for Automatically Managing Secret Application and Maintenance," U.S. Appl. No. 14/069,921, filed Nov. 1, 2013.

Lietz et al., "Method and System for Automatically Managing Secure Communications in Multiple Communications Jurisdiction Zones," U.S. Appl. No. 14/070,168, filed Nov. 1, 2013.

Lietz et al., "Method and System for Accommodating Communications Channels Using Different Secure Communications Protocols," U.S. Appl. No. 14/215,432, filed Mar. 17, 2014.

Lietz et al., "Method and Apparatus to Rotate Data Encryption Keys in Databases with No Down Time," U.S. Appl. No. 14/263,808, filed Apr. 28, 2014.

Cabrera et al., "Method and Apparatus for Multi-Tenancy Secrets Management," U.S. Appl. No. 14/265,930, filed Apr. 30, 2014.

Reddy et al., "Security Architecture of Cloud Computing," *International Journal of Engineering Science and Technology (IJEST)*, vol. 3, No. 9, Sep. 9, 2011, pp. 7149-7155.

Tokuyoshi, "Encryption: Getting a Grip on Key Rotation", Apr. 23, 2009, pp. 1-3. Retrieved from the Internet. <http://www.cio.com/article/2428777/security0/encryption--getting-a-grip-on-key-rotation.html>.

\* cited by examiner

METHOD AND SYSTEM FOR AUTOMATICALLY MANAGING SECRETS IN MULTIPLE DATA SECURITY JURISDICTION ZONES

BACKGROUND

As various forms of distributed computing, such as cloud computing, have come to dominate the computing landscape, modern computing has become a global endeavor. One difficulty encountered when computing on a global scale is the fact that different geographic and/or political regions have different rules and regulations, i.e., data security policies, dictating the various types of secrets, security protocols, and security levels, such as encryption levels and keys, which can be used to protect data within these different geographic and/or political regions.

As a result, the data security policy of a given geographic and/or political region can dictate what secrets can be used to protect data in that geographic and/or political region, e.g., what level of encryption can be used on data within, or data originating from, the geographic and/or political region; what secrets can be sent to that geographic and/or political region, e.g., what encryption keys can be sent to the geographic and/or political region; and what secrets can be applied to data being transferred to the geographic and/or political region, e.g., what type of encryption can be used to encrypt data being sent to the geographic and/or political region.

As a specific illustrative example, the government of China allows only relatively low levels of encryption to be applied to data within China, and/or to be used to protect data that is to be transferred to China. In contrast, many European countries allow for a higher level of encryption to be applied to data within, and/or to be used to protect data that is to be transferred to, their territories. Consequently, an application, service, or system, desiring to encrypt data within China, or transfer data to China, must ensure that the level of encryption used to encrypt data within China, and/or the level of encryption applied to data to be transferred to China, and/or the encryption keys sent to China, conform with Chinese data security policy, while the same application, service, or system desiring to encrypt data within the Germany, or transfer data to Germany, must ensure that the level of encryption used to encrypt data within Germany, and/or the level of encryption applied to data to be transferred to Germany, and/or the encryption keys sent to Germany, conform with German data security policy.

Given that in the modern global computing environment it is often the case that a single application, service, or system is offered, interacts with, and often transfers data between, multiple geographic and/or political regions having different data security policies, ensuring that the data security policies of all the geographic and/or political regions associated with a given application, service, or system can be a daunting, if not overwhelming, task.

This situation, in and of itself, presents a level of complication that often interferes with the efficient processing and transfer of data required in modern computing environments, such as a cloud computing environment. However, the situation is further complicated and aggravated by the fact that there often exist different data security zones, with distinct and different data security policy requirements, within a given geographic or political region, and often within the same computing environment.

As an example, an application or service implemented in a cloud computing environment may, in some cases, be offered and used in different data security zones within the same cloud computing environment or network, and, in some situations, by the same user. In this case, just as in the case of two different geographic or political regions, it must be confirmed that the data security policies of all data security zones are known/understood and met.

As used herein, a given geographic zone, political zone, data security zone, resource, and/or computing environment, having its own associated data security policy is referred to as a data security jurisdiction zone. Consequently, as used herein, the term data security jurisdiction zone refers to both geographic and political zones as well as virtual data security zones within various computing environments.

As used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as allowed secrets data with respect to the data security jurisdiction zone.

It follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

Given the situation described above, significant amounts of time and energy are currently devoted to ensuring that the data security policies associated with various data security jurisdiction zones are met before secrets and/or secrets protected data are transferred to the data security jurisdiction zones. As noted, this often significantly interferes with the efficient and effective operation of various, and numerous, computing environments.

What is needed is a method and system to automatically determine the data security policies associated with various data security jurisdiction zones and then ensure only allowed secrets data is provided to each data security jurisdiction zone.

SUMMARY

In accordance with one embodiment, a method and system for automatically managing secrets in multiple data security jurisdiction zones includes identifying one or more data security jurisdiction zones to which secrets data may be transferred. In one embodiment, data security policy data for the identified data security jurisdiction zones is obtained including data indicating allowed secrets data for the respective data security jurisdiction zones.

In one embodiment, secrets request data representing a request that secrets data be transferred to a resource is received. In one embodiment, a determination of the data security jurisdiction zone associated with the resource is automatically made and security policy data associated with the determined data security jurisdiction zone of the resource is automatically retrieved.

In one embodiment, the data security policy data for the data security jurisdiction zone of the resource is automatically analyzed to determine allowed secrets data with respect to the data security jurisdiction zone of the resource and allowed secrets data with respect to the data security jurisdiction zone of the resource is automatically obtained. In one embodiment, the allowed secrets data is then automatically provided to the resource in the data security jurisdiction zone of the resource.

In accordance with one embodiment, a method and system for automatically managing secrets in multiple data security jurisdiction zones includes identifying one or more data security jurisdiction zones to which secrets data may be transferred. In one embodiment, data security policy data for the identified data security jurisdiction zones is obtained including data indicating allowed secrets data for the respective data security jurisdiction zones.

In one embodiment, for each identified data security jurisdiction zone, the data security policy data for the data security jurisdiction zone is automatically analyzed to determine allowed secrets data with respect to the data security jurisdiction zone. In one embodiment, for each identified data security jurisdiction zone, allowed secrets data with respect to the data security jurisdiction zone is automatically obtained.

In one embodiment, for each identified data security jurisdiction zone, the allowed secrets data for the data security jurisdiction zone is then automatically pre-deployed to an allowed secrets data store associated with the data security jurisdiction zone to await a secrets data request from a resource in the respective data security jurisdiction zone.

Figure 1:
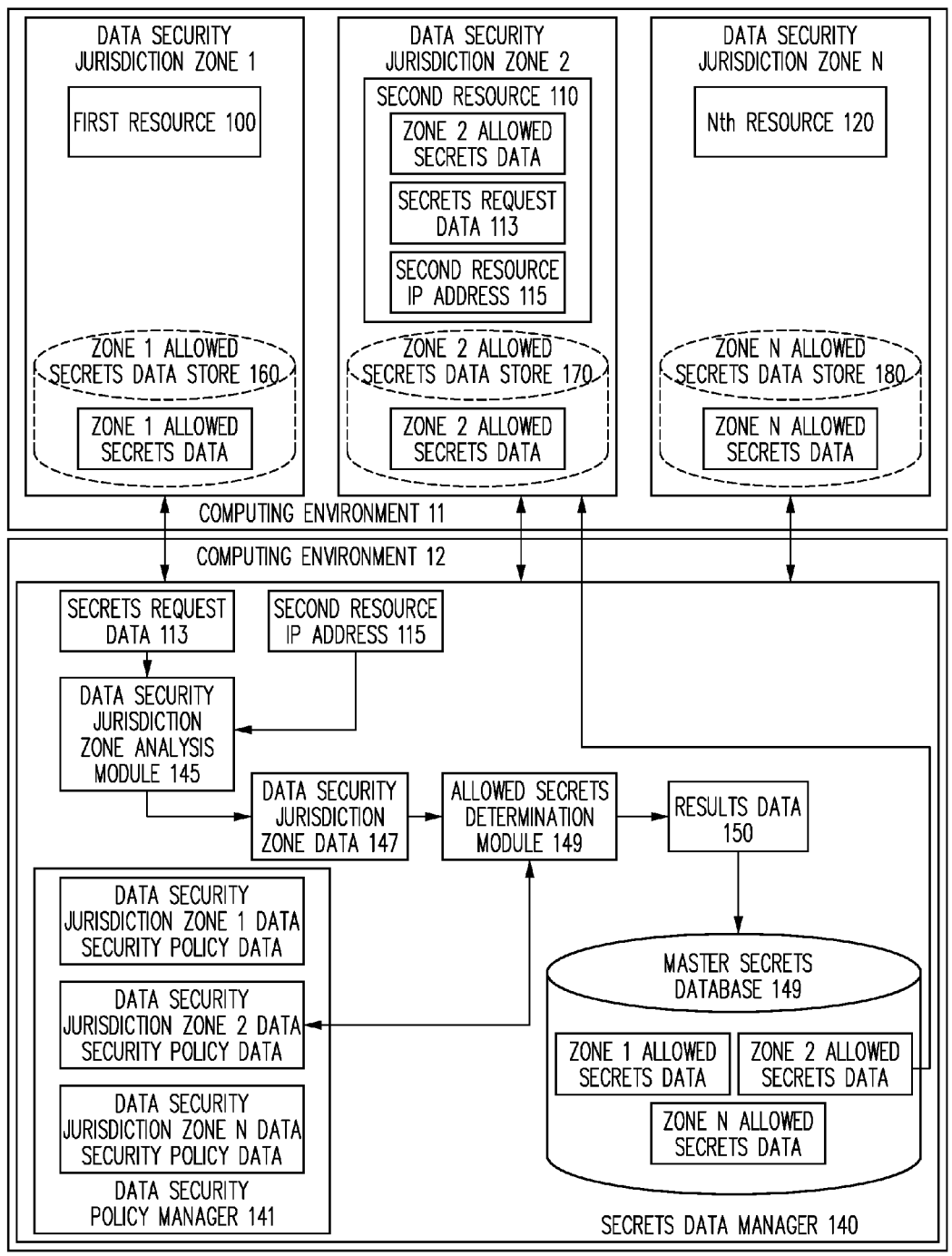
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for automatically managing secrets in multiple data security jurisdiction zones includes a process for automatically managing secrets in multiple data security jurisdiction zones implemented, at least in part, by one or more computing systems.

As used herein, the term "computing system", includes, but is not limited to, a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for automatically managing secrets in multiple data security jurisdiction zones are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations, a party may wish to transfer data between two trusted computing environments, and/or two untrusted computing environments.

In one embodiment, two or more computing systems, and/or two or more computing environments, are connected by one or more communications systems, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for automatically managing secrets in multiple data security jurisdiction zones discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In accordance with one embodiment, one or more data security jurisdiction zones from which, and/or to which, secrets data may be transferred are identified.

As noted above, herein data security jurisdiction zones can be, but are not limited to, physical geographical data security jurisdiction zones, such as geographical regions on the planet subject to specific data security policies; political zones, such as countries or states subject to specific data security policies; virtual data security zones, such as networks, clouds, or portions thereof, subject to specific data security policies; resources and/or networks of resources subject to specific data security policies; computing environments subject to specific data security policies; and/or any other physically, politically, virtually, or logically, delineated data security jurisdiction zones subject to specific data security policies, as discussed herein, and/or as known in the art at the time of filing, and/or as developed/become known after the time of filing.

Consequently, as used herein, the term data security jurisdiction zone refers to both geographic and political zones as well as virtual data security zones within various computing environments.

In one embodiment, the one or more data security jurisdiction zones are identified as data security jurisdiction zones likely to be the location of one or more resources within a cloud computing environment, or other decentralized computing system.

In one embodiment, for each of the identified one or more data security jurisdiction zones, data security policy data is obtained including data indicating allowed secrets data with respect to the data security jurisdiction zone, and/or prohibited secrets data with respect to the data security jurisdiction zone.

In various embodiments, the data security policy data can include, but is not limited to, data security policy data associated with political entities such as local, state, national, or regional government agencies; data security policy data associated with networks or sub-networks of computing systems such as virtual private networks, local area networks, and wide area networks, and/or portions thereof; data security policy data associated with cloud computing environments, or portions of cloud computing environments, such as virtual private clouds, private clouds, or portions of a cloud computing environment implemented in different geographic regions; and/or any other communications policy data related to any data security jurisdiction zone setting forth the allowed secrets data for that data security jurisdiction zone.

In one embodiment, the data security policy data is stored and/or managed and updated through a data security policy manager.

As noted above, the data security policy data for each data security jurisdiction zone includes data indicating allowed secrets data with respect to the data security jurisdiction zone, and/or prohibited secrets data with respect to the data security jurisdiction zone.

As noted above, as used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as allowed secrets data with respect to the data security jurisdiction zone.

As also noted above, it follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

In one embodiment, the data security policy data for the identified data security jurisdiction zones is stored in one or more databases controlled by a data security policy manager. In one embodiment, the data security policy data for the identified data security jurisdiction zones is updated automatically.

Referring to FIG. 1, secrets data manager 140 is shown as being implemented in computing environment 12. As seen in FIG. 1, data security policy manager 141 is shown as including data security jurisdiction zone 1 data security policy data, data security jurisdiction zone 2 data security policy data, and data security jurisdiction zone N data security policy data representing data security policies associated with identified data security jurisdiction zones 1 through N, indicating the allowed secrets data, represented by zone 1 allowed secrets data, zone 2 allowed secrets data, and zone 3 allowed secrets data in master secrets database 149, that are allowed in each of the identified data security jurisdiction zones 1 through N.

In one embodiment, secrets request data is received representing a request that secrets data be transferred to a resource.

Herein, the term "resource" refers to any software or hardware entity or component capable of transferring and/or receiving data. As one specific illustrative example, in one embodiment, the term resources includes a virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity, or entities, capable of transmitting and/or receiving data as discussed herein, and/or as known in the art at the time of filing, and/or as developed/made available after the time of filing.

As used herein, the term "secrets" includes any information, credentials, or other devices, necessary to protect, encrypt, and/or access, data, one or more resources, one or more virtual assets, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data, such as allowed secrets data and/or prohibited secrets data, are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data, such as allowed secrets data and/or prohibited secrets data, can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data, such as allowed secrets data and/or prohibited secrets data, can be classified according to whether the secrets provide access to internal resources, such as databases and data in a data center, or access to external resources such as services offered through a cloud or the Internet.

In one embodiment, the different types of secrets are provided by, and/or originate from, different secret sources. In one embodiment, the secrets data representing the different classes of secrets are maintained, at least initially, in separate secret databases, systems, or data stores, and/or in a master secrets database.

In one embodiment, secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the secrets data controlled and/or accessed by secrets manager system includes data representing one or more types of secrets used to control access to one or more types of resources associated with the types of secrets by one or more entities, such as a virtual asset, residing physically or logically outside the data/resources services center where the secrets data is maintained, and/or accessed.

Referring to FIG. 1, first resource 100 is shown as residing in data security jurisdiction zone 1, second resource 110 is shown as residing in data security jurisdiction zone 2, and Nth resource 120 is shown as residing in data security jurisdiction zone N. As also seen in FIG. 1, in this specific illustrative example, first resource 100, second resource 110, and Nth resource 120, are in computing environment 11.

Also seen in FIG. 1 are allowed secrets data, represented by zone 1 allowed secrets data, zone 2 allowed secrets data, and zone 3 allowed secrets data in master secrets database 129. As seen in FIG. 1, in this specific illustrative example, second resource 110 is stipulated to request secrets data. Therefore, secrets request data 113 and second resource IP address 115 are received from second resource 110 at secrets data manager 140.

In one embodiment, a determination is automatically made as to the data security jurisdiction zone associated with the requesting resource that is the source of the secrets request data, i.e., a determination is automatically made as to the data security jurisdiction zone of the resource.

In one embodiment, the determination is automatically made as to the data security jurisdiction zone of the resource using information contained in the IP address associated with the resource, and/or any other mechanism as discussed herein, and/or as known in the art at the time of filing, and/or as developed/made available after the time of filing, for determining a data security jurisdiction zone associated with a resource.

Referring to FIG. 1, as noted above, in this specific illustrative example, second resource 110 is stipulated to request secrets data. Therefore, secrets request data 113 and second resource IP address 115 are received from second resource 110 at secrets data manager 140. As also seen in FIG. 1, secrets request data 113 and second resource IP address 115 are used as input data to data security jurisdiction zone analysis module 145 which processes secrets request data 113 and second resource IP address 115 to generate data security jurisdiction zone data 147, that, in this specific illustrative example, indicates second resource 110 resides in data security jurisdiction zone 2.

In one embodiment, once the data security jurisdiction zone of the resource is automatically determined, the data security policy data for the data security jurisdiction zone of the resource is obtained.

In one embodiment, once the data security jurisdiction zone of the resource is automatically determined, the data security policy data for the data security jurisdiction zone of the resource is obtained from the data security policy data stored in one or more databases managed and controlled by the data security policy manager.

Referring to FIG. 1, data security jurisdiction zone data 147, that, in this specific illustrative example, indicates second resource 110 resides in data security jurisdiction zone 2, is used as input data to allowed secrets determination module 149 which, in turn, obtains the appropriate data security policy data for the identified data security jurisdiction zone of data security jurisdiction zone data 147. As noted, in this specific illustrative example, data security jurisdiction zone data 147 indicates data security jurisdiction zone 2 so that, in this specific illustrative example, allowed secrets determination module 149 retrieves data security jurisdiction zone 2 data security data.

In one embodiment, the data security policy data for the data security jurisdiction zone of the resource is then automatically analyzed to determine allowed secrets data with respect to the data security jurisdiction zone of the resource that complies with the data security policy data of the data security jurisdiction zone of the resource.

In various embodiments, allowed secrets data with respect to the data security jurisdiction zone of the resource that complies with the data security policy data of the data security jurisdiction zone of the resource includes, but is not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone of the resource.

In other embodiments, other types of allowed secrets data with respect to the data security jurisdiction zone of the resource include any allowed secrets data as discussed herein, and/or as known in the art at the time of filing, and/or as developed/made available after the time of filing.

Referring to FIG. 1, allowed secrets determination module 149 retrieves data security jurisdiction zone 2 data security data and processes data security jurisdiction zone 2 data security data to generate results data 150 that, in this specific illustrative example, indicate that the allowed secrets data for data security jurisdiction zone 2, shown as zone 2 allowed secrets data, is the allowed secrets data complying with the data security jurisdiction zone 2 data security data.

In one embodiment, once the data security policy data for the data security jurisdiction zone of the resource is automatically analyzed to determine allowed secrets data with respect to the data security jurisdiction zone of the resource that complies with the data security policy data of the data security jurisdiction zone of the resource, allowed secrets data with respect to the data security jurisdiction zone of the resource representing one or more allowed secrets is obtained/collected.

As noted above, the secrets represented by the allowed secrets data, are provided by, and/or originate from, different secret sources. In one embodiment, the secrets data representing the different classes of secrets are maintained, at least initially, in separate secret databases, systems, or data stores, and/or in a master secrets database.

As noted above, in one embodiment, allowed secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the allowed secrets data controlled and/or accessed by secrets manager system includes data representing one or more types of allowed secrets data used to control access to one or more types of resources associated with the types of allowed secrets data by one or more entities, such as a virtual asset, residing physically or logically outside the data/resources services center where the secrets data is maintained, and/or accessed.

As noted above, in various embodiments, the data security policy data for the identified data security jurisdiction zones includes data indicating allowed encryption levels within the identified data security jurisdiction zones. Consequently, in various embodiments, the secrets request data represents a request for encryption key data to be transferred to the resource and the allowed secrets data is allowed encryption key data including at least one encryption key in compliance with the data security policy data for the data security jurisdiction zone of the resource.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

Referring to FIG. 1, the allowed secrets data for data security jurisdiction zone 2, shown as zone 2 allowed secrets data, is the allowed secrets data complying with the data security jurisdiction zone 2 data security data. Therefore, in one embodiment, zone 2 allowed secrets data is obtained.

In one embodiment, once the allowed secrets data with respect to the data security jurisdiction zone of the resource representing one or more allowed secrets is obtained/collected, the allowed secrets data with respect to the data security jurisdiction zone of the resource is provided to the resource.

Referring to FIG. 1, zone 2 allowed secrets data is provided to second resource 110 in data security jurisdiction zone 2 from master secrets database 149.

In one embodiment, the allowed secrets data with respect to the data security jurisdiction zone of the resource is provided to the resource by automatically transferring the allowed secrets data to a secrets data store in the data security jurisdiction zone of the resource accessible by the resource.

Referring to FIG. 1, zone 2 allowed secrets data is provided to zone 2 allowed secrets data store 170 in data security jurisdiction zone 2 from master secrets database 149.

Using the method and system for automatically managing secrets in multiple data security jurisdiction zones discussed herein, data security policies associated with various data security jurisdiction zones is obtained. Then when a request for secrets data is received from a resource, the data security jurisdiction zone of the resource is automatically determined and the data security policy data for the data security jurisdiction zone of the resource is automatically obtained/retrieved and analyzed to determine allowed secrets data for the resource.

Consequently, using the method and system for automatically managing secrets in multiple data security jurisdiction zones discussed herein, appropriate/allowed secrets for resources in different data security jurisdiction zones is automatically provided in an efficient and effective manner.

In accordance with one embodiment, one or more data security jurisdiction zones from which, and/or to which, secrets data may be transferred are identified.

As noted above, herein data security jurisdiction zones can be, but are not limited to, physical geographical data security jurisdiction zones, such as geographical regions on the planet subject to specific data security policies; political zones, such as countries or states subject to specific data security policies; virtual data security zones, such as networks, clouds, or portions thereof, subject to specific data security policies; resources and/or networks of resources subject to specific data security policies; computing environments subject to specific data security policies; and/or any other physically, politically, or virtually, delineated data security jurisdiction zones subject to specific data security policies, as discussed herein, and/or as known in the art at the time of filing, and/or as developed/become known after the time of filing.

Consequently, as used herein, the term data security jurisdiction zone refers to both geographic and political zones as well as virtual data security zones within various computing environments.

In one embodiment, the one or more data security jurisdiction zones are identified as data security jurisdiction zones likely to be the location of one or more resources within a cloud computing environment, or other decentralized computing system.

In one embodiment, for each of the identified one or more data security jurisdiction zones, data security policy data is obtained including data indicating allowed secrets data with respect to the data security jurisdiction zone, and/or prohibited secrets data with respect to the data security jurisdiction zone.

In various embodiments, the data security policy data can include, but is not limited to, data security policy data associated with political entities such as local, state, national, or regional government agencies; data security policy data associated with networks or sub-networks of computing systems such as virtual private networks, local area networks, and wide area networks, and/or portions thereof; data security policy data associated with cloud computing environments, or portions of cloud computing environments such as virtual private clouds, private clouds, or portions of a cloud computing environment implemented in different geographic regions; and/or any other communications policy data related to any data security jurisdiction zone setting forth the allowed secrets data for that data security jurisdiction zone.

In one embodiment, the data security policy data is stored and/or managed and updated through a data security policy manager.

As noted above, the data security policy data for each data security jurisdiction zone includes data indicating allowed secrets data with respect to the data security jurisdiction zone, and/or prohibited secrets data with respect to the data security jurisdiction zone.

As noted above, as used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as allowed secrets data with respect to the data security jurisdiction zone.

As also noted above, it follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

In one embodiment, the data security policy data for the identified data security jurisdiction zones is stored in one or more databases controlled by the data security policy manager. In one embodiment, the data security policy data for the identified data security jurisdiction zones is updated automatically.

In one embodiment, for each identified data security jurisdiction zone, the data security policy data for the data security jurisdiction zone is automatically analyzed to determine allowed secrets data with respect to the data security jurisdiction zone.

As noted above, as used herein, the term "secrets" includes any information, credentials, or other devices, necessary to protect, encrypt, and/or access, data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data, such as allowed secrets data and/or prohibited secrets data, are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data, such as allowed secrets data and/or prohibited secrets data, can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data, such as allowed secrets data and/or prohibited secrets data, can be classified according to whether the secrets provide access to internal resources, such as databases and data in a data center, or access to external resources such as services offered through a cloud or the Internet.

In various embodiments, allowed secrets data for each identified data security jurisdiction zone includes, but is not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone.

In other embodiments, other types of allowed secrets data with respect to each of the identified data security jurisdiction zones include any allowed secrets data as discussed herein, and/or as known in the art at the time of filing, and/or as developed/made available after the time of filing.

In one embodiment, for each identified data security jurisdiction zone, allowed secrets data with respect to the data security jurisdiction zone is automatically obtained/collected.

As noted above, in one embodiment, the different types of allowed secrets are provided by, and/or originate from, different secret sources. In one embodiment, the secrets data representing the different classes of secrets are maintained, at least initially, in separate secret databases, systems, or data stores, and/or in a master secrets database. Consequently, in various embodiments, the allowed secrets data with respect to each of the identified data security jurisdiction zones is automatically obtained/collected from various sources such as, but not limited to, a secrets manager system that is associated with a data/resources services center, such as a data center, providing data and/or resources to distributed computing systems, such as cloud-based computing environments and resources.

In one embodiment, the allowed secrets data with respect to each of the identified data security jurisdiction zones automatically obtained/collected includes data representing one or more types of allowed secrets used to control access to one or more types of resources associated with the types of secrets by one or more entities, such as a virtual asset.

As noted above, in various embodiments, the data security policy data for the identified data security jurisdiction zones includes data indicating allowed encryption levels within the identified data security jurisdiction zones. Consequently, in various embodiments, the allowed secrets data for each data security jurisdiction zone includes allowed encryption key data including at least one encryption key in compliance with the data security policy data for the data security jurisdiction zone.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

In one embodiment, once the allowed secrets data with respect to each of the identified data security jurisdiction zones representing one or more allowed secrets is obtained/collected, the obtained/collected allowed secrets data with respect to each of the identified data security jurisdiction zones is pre-deployed, e.g., transferred to, an allowed secrets data store associated with each respective data security jurisdiction zone to await a secrets request from a resource in each respective identified data security jurisdiction zone.

In one embodiment, the obtained/collected allowed secrets data with respect to each of the identified data security jurisdiction zones is pre-deployed, e.g., transferred to, an allowed secrets data store associated with each respective data security jurisdiction zone located in the respective data security jurisdiction zone to await a secrets request from a resource in each respective identified data security jurisdiction zone.

Referring to FIG. 1, zone 1 allowed secrets data is provided to zone 1 allowed secrets data store 160 in data security jurisdiction zone 1 from master secrets database 149; zone 2 allowed secrets data is provided to zone 2 allowed secrets data store 170 in data security jurisdiction zone 2 from master secrets database 149; and zone N allowed secrets data is provided to zone N allowed secrets data store 180 in data security jurisdiction zone N from master secrets database 149.

In one embodiment, when secrets request data is received representing a request that secrets data be transferred to a first resource, a determination is automatically made as to the data security jurisdiction zone associated with the first resource that is the source of the secrets request data, i.e., a determination is automatically made as to the data security jurisdiction zone of the first resource.

In one embodiment, the determination is automatically made as to the data security jurisdiction zone of the first resource using information contained in the IP address associated with the first resource, and/or any other mechanism as discussed herein, and/or as known in the art at the time of filing, and/or as developed/made available after the time of filing, for determining a data security jurisdiction zone associated with a resource.

In one embodiment, the data security jurisdiction zone of the first resource is determined to be a first data security jurisdiction zone.

In one embodiment, once the data security jurisdiction zone of the first resource is determined to be the first data security jurisdiction zone, the first resource is provided access to the allowed secrets data with respect to the first data security jurisdiction zone pre-deployed to the allowed secrets data store associated with the first data security jurisdiction zone.

Using the method and system for automatically managing secrets in multiple data security jurisdiction zones discussed herein, data security policies associated with various identified data security jurisdiction zones is obtained. Then the data security policy data for each identified data security jurisdiction zone is automatically analyzed to determine allowed secrets data for each data security jurisdiction zone and allowed secrets data is obtained and pre-deployed to allowed secrets data stores associated with each identified data security jurisdiction zone.

Consequently, using the method and system for automatically managing secrets in multiple data security jurisdiction zones discussed herein, appropriate/allowed secrets for different data security jurisdiction zones are automatically pre-deployed to provide allowed secrets data to resources in the respective data security jurisdiction zones in an efficient and effective manner.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for automatically managing secrets in multiple data security jurisdiction zones includes identifying one or more data security jurisdiction zones to which secrets data may be transferred.

In one embodiment, data security policy data for the identified data security jurisdiction zones is obtained including data indicating allowed secrets data for the respective data security jurisdiction zones.

In one embodiment, secrets request data representing a request that secrets data be transferred to a resource is received. In one embodiment, a determination of the data security jurisdiction zone associated with the resource is automatically made and security policy data associated with the determined data security jurisdiction zone of the resource is automatically retrieved.

In one embodiment, the data security policy data for the data security jurisdiction zone of the resource is automatically analyzed to determine allowed secrets data with respect to the data security jurisdiction zone of the resource and allowed secrets data with respect to the data security jurisdiction zone of the resource is automatically obtained. In one embodiment, the allowed secrets data is then automatically provided to the resource in the data security jurisdiction zone of the resource.

Figure 2:
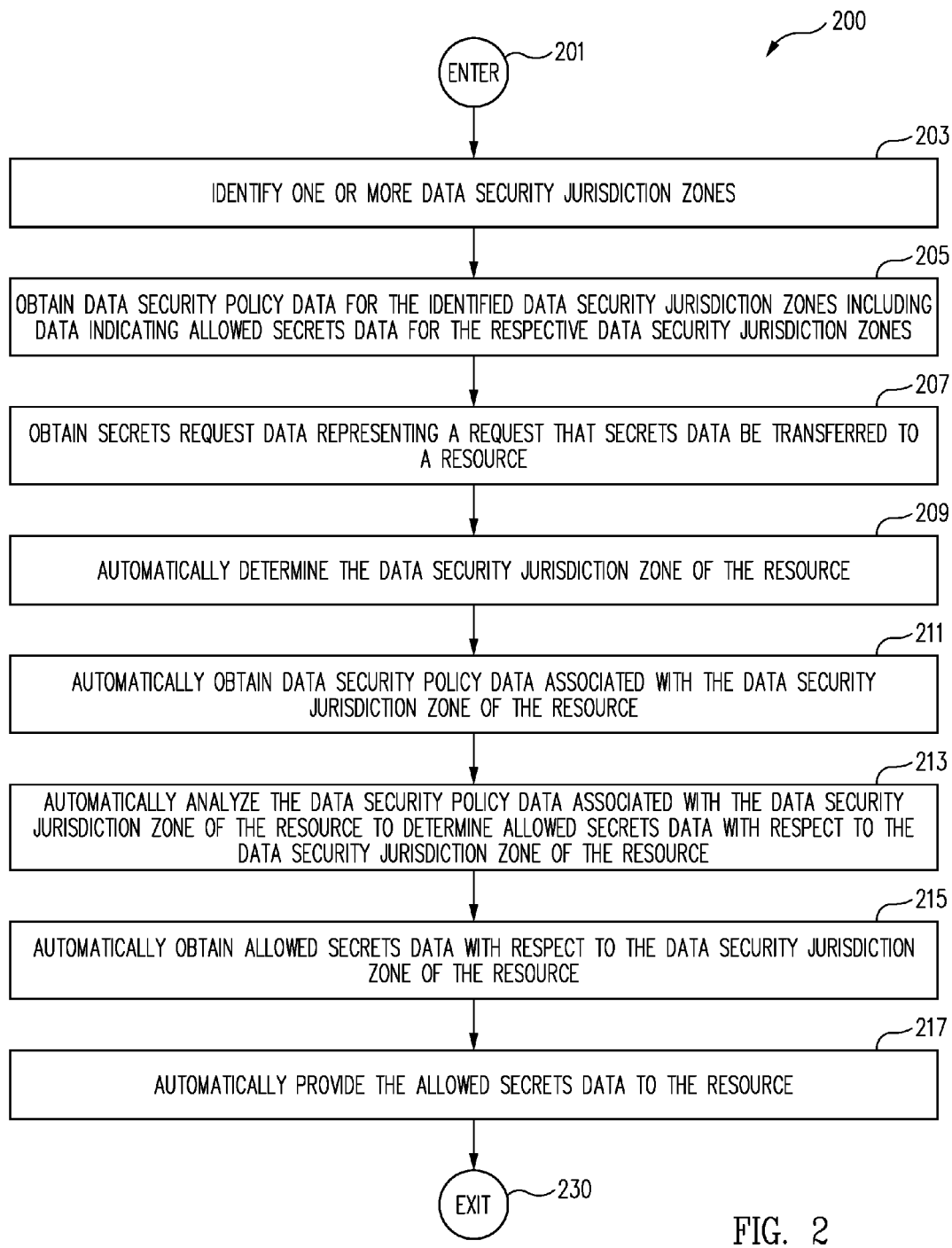
FIG. 2 is a flow chart depicting a process for automatically managing secrets in multiple data security jurisdiction zones in accordance with one embodiment.

FIG. 2 is a flow chart of a process 200 for automatically managing secrets in multiple data security jurisdiction zones in accordance with one embodiment. In one embodiment, process 200 for automatically managing secrets in multiple data security jurisdiction zones begins at ENTER OPERATION 201 of FIG. 2 and process flow proceeds to IDENTIFY ONE OR MORE DATA SECURITY JURISDICTION ZONES OPERATION 203.

In one embodiment, at IDENTIFY ONE OR MORE DATA SECURITY JURISDICTION ZONES OPERATION 203 one or more data security jurisdiction zones from which, and/or to which, secrets data may be transferred are identified.

As noted above, herein data security jurisdiction zones can be, but are not limited to, physical geographical data security jurisdiction zones, such as geographical regions on the planet subject to specific data security policies; political zones, such as countries or states subject to specific data security policies; virtual data security zones, such as networks, clouds, or portions thereof, subject to specific data security policies; resources and/or networks of resources subject to specific data security policies; computing environments subject to specific data security policies; and/or any other physically, politically, or virtually, delineated data security jurisdiction zones subject to specific data security policies, as discussed herein, and/or as known in the art at the time of filing, and/or as developed/become known after the time of filing.

Consequently, as used herein, the term data security jurisdiction zone refers to both geographic and political zones as well as virtual data security zones within various computing environments.

In one embodiment, at IDENTIFY ONE OR MORE DATA SECURITY JURISDICTION ZONES OPERATION 203 the one or more data security jurisdiction zones are identified as data security jurisdiction zones likely to be the location of one or more resources within a cloud computing environment, or other decentralized computing system.

In one embodiment, once one or more data security jurisdiction zones from which, and/or to which, secrets data may be transferred are identified at IDENTIFY ONE OR MORE DATA SECURITY JURISDICTION ZONES OPERATION 203, process flow proceeds to OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205.

In one embodiment, at OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205 for each of the identified one or more data security jurisdiction zones of IDENTIFY ONE OR MORE DATA SECURITY JURISDICTION ZONES TO WHICH SECRETS DATA MAY BE TRANSFERRED OPERATION 203, data security policy data is obtained including data indicating allowed secrets data with respect to the data security jurisdiction zone, and/or prohibited secrets data with respect to the data security jurisdiction zone.

In various embodiments, the data security policy data of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205 can include, but is not limited to, data security policy data associated with political entities such as local, state, national, or regional government agencies; data security policy data associated with networks or sub-networks of computing systems such as virtual private networks, local area networks, and wide area networks, and/or portions thereof; data security policy data associated with cloud computing environments, or portions of cloud computing environments such as virtual private clouds, private clouds, or portions of a cloud computing environment implemented in different geographic regions; and/or any other communications policy data related to any data security jurisdiction zone setting forth the allowed secrets data for that data security jurisdiction zone.

In one embodiment, the data security policy data of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205 is stored and/or managed and updated through a data security policy manager.

As noted above, the data security policy data for each data security jurisdiction zone of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205 includes data indicating allowed secrets data with respect to the data security jurisdiction zone, and/or prohibited secrets data with respect to the data security jurisdiction zone.

As noted above, as used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as allowed secrets data with respect to the data security jurisdiction zone.

As also noted above, it follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

In one embodiment, the data security policy data for the identified data security jurisdiction zones is stored in one or more databases controlled by a data security policy manager. In one embodiment, the data security policy data for the identified data security jurisdiction zones is updated automatically.

In one embodiment, once, for each of the identified one or more data security jurisdiction zones of IDENTIFY ONE OR MORE DATA SECURITY JURISDICTION ZONES TO WHICH SECRETS DATA MAY BE TRANSFERRED OPERATION 203, data security policy data is obtained, including data indicating allowed secrets data with respect to the data security jurisdiction zone, and/or prohibited secrets data with respect to the data security jurisdiction zone, at OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205, process flow proceeds to OBTAIN SECRETS REQUEST DATA REPRESENTING A REQUEST THAT SECRETS DATA BE TRANSFERRED TO A RESOURCE OPERATION 207.

In one embodiment, at OBTAIN SECRETS REQUEST DATA REPRESENTING A REQUEST THAT SECRETS DATA BE TRANSFERRED TO A RESOURCE OPERATION 207 secrets request data is received representing a request that secrets data be transferred to a resource.

Herein, the term "resource" refers to any software or hardware entity or component capable of transferring and/or receiving data. As one specific illustrative example, in one embodiment, the term resources includes a virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity or entities capable of transmitting and/or receiving data as discussed herein, and/or as known in the art at the time of filing, and/or as developed/made available after the time of filing.

As used herein, the term "secrets" includes any information, credentials, or other devices, necessary to protect, encrypt, and/or access, data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data of OBTAIN SECRETS REQUEST DATA REPRESENTING A REQUEST THAT SECRETS DATA BE TRANSFERRED TO A RESOURCE OPERATION 207, such as allowed secrets data and/or prohibited secrets data, are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data of OBTAIN SECRETS REQUEST DATA REPRESENTING A REQUEST THAT SECRETS DATA BE TRANSFERRED TO A RESOURCE OPERATION 207, such as allowed secrets data and/or prohibited secrets data, can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data of OBTAIN SECRETS REQUEST DATA REPRESENTING A REQUEST THAT SECRETS DATA BE TRANSFERRED TO A RESOURCE OPERATION 207, such as allowed secrets data and/or prohibited secrets data, can be classified according to whether the secrets provide access to internal resources, such as databases and data in a data center, or access to external resources such as services offered through a cloud or the Internet.

In one embodiment, the different types of secrets of OBTAIN SECRETS REQUEST DATA REPRESENTING A REQUEST THAT SECRETS DATA BE TRANSFERRED TO A RESOURCE OPERATION 207 are provided by, and/or originate from, different secret sources. In one embodiment, the secrets data representing the different classes of secrets are maintained, at least initially, in separate secret databases, systems, or data stores, and/or in a master secrets database.

In one embodiment, at OBTAIN SECRETS REQUEST DATA REPRESENTING A REQUEST THAT SECRETS DATA BE TRANSFERRED TO A RESOURCE OPERATION 207 secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the secrets data controlled and/or accessed by secrets manager system includes data representing one or more types of secrets used to control access to one or more types of resources associated with the types of secrets by one or more entities, such as a virtual asset, residing physically or logically outside the data/resources services center where the secrets data is maintained, and/or accessed.

In one embodiment, once secrets request data is received representing a request that secrets data be transferred to a resource at OBTAIN SECRETS REQUEST DATA REPRESENTING A REQUEST THAT SECRETS DATA BE TRANSFERRED TO A RESOURCE OPERATION 207, process flow proceeds to AUTOMATICALLY DETERMINE THE DATA SECURITY JURISDICTION ZONE OF THE RESOURCE OPERATION 209.

In one embodiment, at AUTOMATICALLY DETERMINE THE DATA SECURITY JURISDICTION ZONE OF THE RESOURCE OPERATION 209 a determination is automatically made as to the data security jurisdiction zone of IDENTIFY ONE OR MORE DATA SECURITY JURISDICTION ZONES TO WHICH SECRETS DATA MAY BE TRANSFERRED OPERATION 203 associated with the requesting resource that is the source of the secrets request data, i.e., a determination is automatically made as to the data security jurisdiction zone of the resource of OBTAIN SECRETS REQUEST DATA REPRESENTING A REQUEST THAT SECRETS DATA BE TRANSFERRED TO A RESOURCE OPERATION 207.

In one embodiment, at AUTOMATICALLY DETERMINE THE DATA SECURITY JURISDICTION ZONE OF THE RESOURCE OPERATION 209 the determination is automatically made as to the data security jurisdiction zone of the resource using information contained in the IP address associated with the resource, and/or any other mechanism as discussed herein, and/or as known in the art at the time of filing, and/or as developed/made available after the time of filing, for determining a data security jurisdiction zone associated with a resource.

In one embodiment, once a determination is automatically made as to the data security jurisdiction zone of IDENTIFY ONE OR MORE DATA SECURITY JURISDICTION ZONES TO WHICH SECRETS DATA MAY BE TRANSFERRED OPERATION 203 associated with the requesting resource that is the source of the secrets request data, i.e., a determination is automatically made as to the data security jurisdiction zone of the resource of OBTAIN SECRETS REQUEST DATA REPRESENTING A REQUEST THAT SECRETS DATA BE TRANSFERRED TO A RESOURCE OPERATION 207 at AUTOMATICALLY DETERMINE THE DATA SECURITY JURISDICTION ZONE OF THE RESOURCE OPERATION 209, process flow proceeds to AUTOMATICALLY OBTAIN DATA SECURITY POLICY DATA ASSOCIATED WITH THE DATA SECURITY JURISDICTION ZONE OF THE RESOURCE OPERATION 211.

In one embodiment, once the data security jurisdiction zone of the resource is automatically determined at AUTO- MATICALLY DETERMINE THE DATA SECURITY JURISDICTION ZONE OF THE RESOURCE OPERATION 209, the data security policy data for the data security jurisdiction zone of the resource is obtained at AUTOMATICALLY OBTAIN DATA SECURITY POLICY DATA ASSOCIATED WITH THE DATA SECURITY JURISDICTION ZONE OF THE RESOURCE OPERATION 211.

In one embodiment, at AUTOMATICALLY OBTAIN DATA SECURITY POLICY DATA ASSOCIATED WITH THE DATA SECURITY JURISDICTION ZONE OF THE RESOURCE OPERATION 211 the data security policy data for the data security jurisdiction zone of the resource is obtained from the data security policy data stored in one or more databases managed and controlled by the data security policy manager.

In one embodiment, once the data security policy data for the data security jurisdiction zone of the resource is obtained at AUTOMATICALLY OBTAIN DATA SECURITY POLICY DATA ASSOCIATED WITH THE DATA SECURITY JURISDICTION ZONE OF THE RESOURCE OPERATION 211, process flow proceeds to AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 213.

In one embodiment, at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 213 the data security policy data for the data security jurisdiction zone of the resource is automatically analyzed to determine allowed secrets data with respect to the data security jurisdiction zone of the resource that complies with the data security policy data of the data security jurisdiction zone of the resource.

In various embodiments, allowed secrets data with respect to the data security jurisdiction zone of the resource that complies with the data security policy data of the data security jurisdiction zone of the resource includes, but is not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone of the resource.

In other embodiments, other types of allowed secrets data with respect to the data security jurisdiction zone of the resource include any allowed secrets data as discussed herein, and/or as known in the art at the time of filing, and/or as developed/made available after the time of filing.

In one embodiment, once the data security policy data for the data security jurisdiction zone of the resource is automatically analyzed to determine allowed secrets data with respect to the data security jurisdiction zone of the resource that complies with the data security policy data of the data security jurisdiction zone of the resource at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 213, process flow proceeds to AUTOMATICALLY OBTAIN ALLOWED SECRETS DATA WITH RESPECT TO THE DATA SECURITY JURISDICTION ZONE OF THE RESOURCE OPERATION 215.

In one embodiment, once the data security policy data for the data security jurisdiction zone of the resource is automatically analyzed to determine allowed secrets data with respect to the data security jurisdiction zone of the resource that complies with the data security policy data of the data security jurisdiction zone of the resource at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 213, allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 215.

As noted above, the secrets represented by the allowed secrets data, are provided by, and/or originate from, different secret sources. In one embodiment, the secrets data representing the different classes of secrets are maintained, at least initially, in separate secret databases, systems, or data stores, and/or in a master secrets database.

As noted above, in one embodiment, allowed secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the allowed secrets data controlled and/or accessed by secrets manager system includes data representing one or more types of allowed secrets data used to control access to one or more types of resources associated with the types of allowed secrets data by one or more entities, such as a virtual asset, residing physically or logically outside the data/resources services center where the secrets data is maintained, and/or accessed.

As noted above, in various embodiments, the data security policy data for the identified data security jurisdiction zones includes data indicating allowed encryption levels within the identified data security jurisdiction zones. Consequently, in various embodiments, the secrets request data represents a request for encryption key data to be transferred to the resource and the allowed secrets data is allowed encryption key data including at least one encryption key in compliance with the data security policy data for the data security jurisdiction zone of the resource.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

In one embodiment, once allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 215, process flow proceeds AUTOMATICALLY PROVIDE THE ALLOWED SECRETS DATA TO THE RESOURCE OPERATION 217.

In one embodiment, once the allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 215, the allowed secrets data with respect to the data security jurisdiction zone of the resource is provided to the resource at AUTOMATICALLY PROVIDE THE ALLOWED SECRETS DATA TO THE RESOURCE OPERATION 217.

In one embodiment, at AUTOMATICALLY PROVIDE THE ALLOWED SECRETS DATA TO THE RESOURCE OPERATION 217 the allowed secrets data with respect to the data security jurisdiction zone of the resource is provided to the resource by automatically transferring the allowed secrets data to a secrets data store in the data security jurisdiction zone of the resource accessible by the resource.

In one embodiment, once the allowed secrets data with respect to the data security jurisdiction zone of the resource is provided to the resource at AUTOMATICALLY PROVIDE THE ALLOWED SECRETS DATA TO THE RESOURCE OPERATION 217, process flow proceeds to EXIT OPERATION 230.

In one embodiment, at EXIT OPERATION 230 process 200 for automatically managing secrets in multiple data security jurisdiction zones is exited to await new data.

Using process 200 for automatically managing secrets in multiple data security jurisdiction zones, data security policies associated with various data security jurisdiction zones is obtained. Then when a request for secrets data is received from a resource, the data security jurisdiction zone of the resource is automatically determined and the data security policy data for the data security jurisdiction zone of the resource is automatically obtained/retrieved and analyzed to determine allowed secrets data for the resource.

Consequently, using process 200 for automatically managing secrets in multiple data security jurisdiction zones, appropriate/allowed secrets for resources in different data security jurisdiction zones is automatically provided in an efficient and effective manner.

In accordance with one embodiment, a method and system for automatically managing secrets in multiple data security jurisdiction zones includes identifying one or more data security jurisdiction zones to which secrets data may be transferred. In one embodiment, data security policy data for the identified data security jurisdiction zones is obtained including data indicating allowed secrets data for the respective data security jurisdiction zones.

In one embodiment, for each identified data security jurisdiction zone, the data security policy data for the data security jurisdiction zone is automatically analyzed to determine allowed secrets data with respect to the data security jurisdiction zone. In one embodiment, for each identified data security jurisdiction zone, allowed secrets data with respect to the data security jurisdiction zone is automatically obtained.

In one embodiment, for each identified data security jurisdiction zone the allowed secrets data for the data security jurisdiction zone is then automatically pre-deployed to an allowed secrets data store associated with the data security jurisdiction zone.

Figure 3:
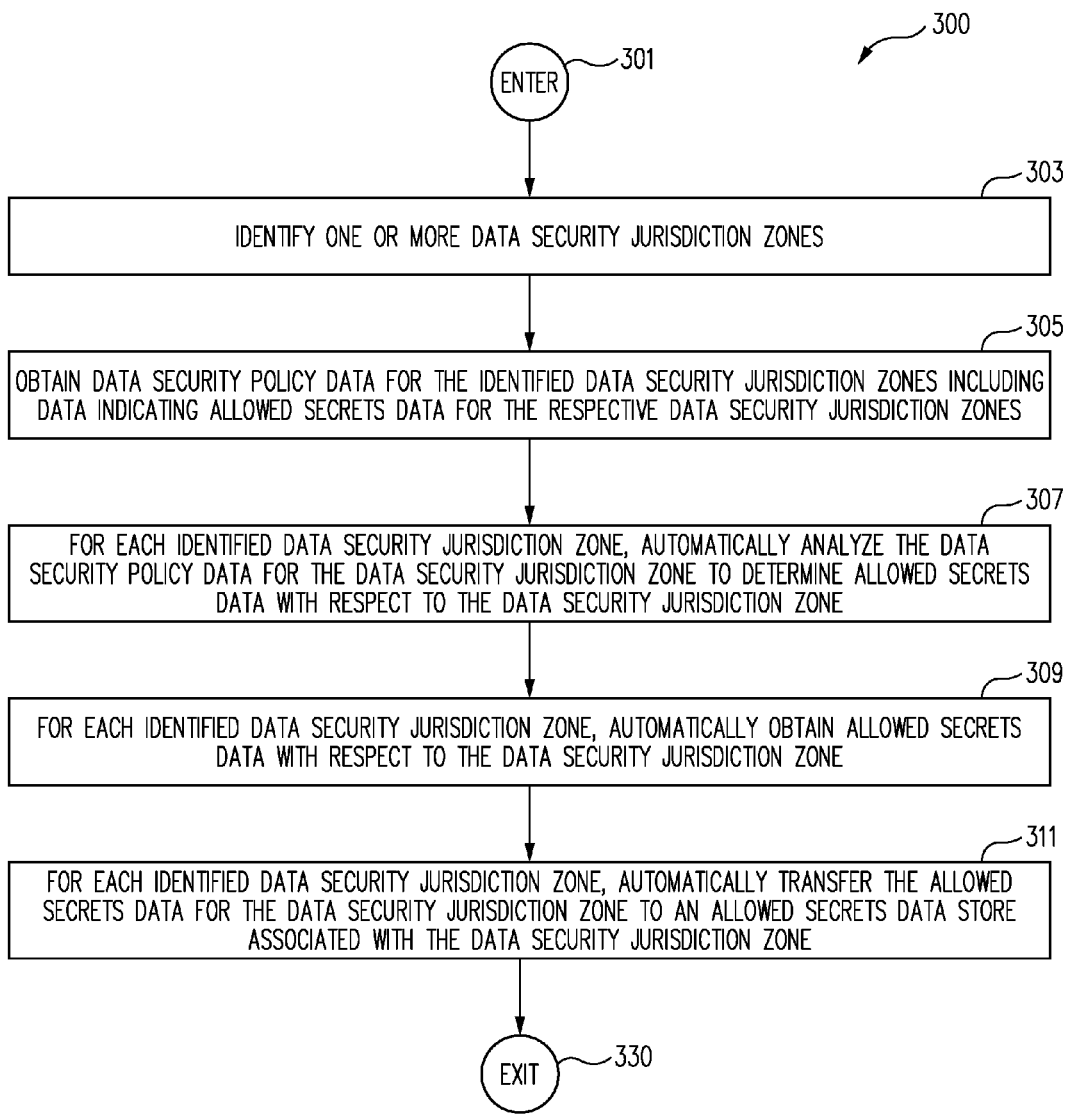
FIG. 3 is a flow chart depicting a process for automatically managing secrets in multiple data security jurisdiction zones in accordance with one embodiment.

FIG. 3 is a flow chart of a process 300 for automatically managing secrets in multiple data security jurisdiction zones in accordance with one embodiment. In one embodiment, process 300 for automatically managing secrets in multiple data security jurisdiction zones begins at ENTER OPERATION 301 of FIG. 3 and process flow proceeds to IDENTIFY ONE OR MORE DATA SECURITY JURISDICTION ZONES OPERATION 303.

In various embodiments, IDENTIFY ONE OR MORE DATA SECURITY JURISDICTION ZONES OPERATION 303 and OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 305 of process 300 for automatically managing secrets in multiple data security jurisdiction zones are substantially identical to IDENTIFY ONE OR MORE DATA SECURITY JURISDICTION ZONES OPERATION 203 and OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 205 of process 200 for automatically managing secrets in multiple data security jurisdiction zones discussed above. Consequently, the reader is referred to the discussion above for a more detailed discussion of IDENTIFY ONE OR MORE DATA SECURITY JURISDICTION ZONES OPERATION 303 and OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 305.

In one embodiment, once, for each of the identified one or more data security jurisdiction zones of IDENTIFY ONE OR MORE DATA SECURITY JURISDICTION ZONES TO WHICH SECRETS DATA MAY BE TRANSFERRED OPERATION 303, data security policy data is obtained including data indicating allowed secrets data with respect to the data security jurisdiction zone, and/or prohibited secrets data with respect to the data security jurisdiction zone at OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 305, process flow proceeds to FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307.

In one embodiment, at FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307, for each identified data security jurisdiction zone of IDENTIFY ONE OR MORE DATA SECURITY JURISDICTION ZONES OPERATION 303, the data security policy data for the data security jurisdiction zone of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 305 is automatically analyzed to determine allowed secrets data with respect to the data security jurisdiction zone.

As noted above, as used herein, the term "secrets" includes any information, credentials, or other devices, necessary to protect, encrypt, and/or access, data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data, such as allowed secrets data and/or prohibited secrets data, are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data, such as allowed secrets data and/or prohibited secrets data, can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data, such as allowed secrets data and/or prohibited secrets data, can be classified according to whether the secrets provide access to internal resources, such as databases and data in a data center, or access to external resources such as services offered through a cloud or the Internet.

In various embodiments, allowed secrets data for each identified data security jurisdiction zone of FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307 includes, but is not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone.

In other embodiments, other types of allowed secrets data with respect to each of the identified data security jurisdiction zones include any allowed secrets data as discussed herein, and/or as known in the art at the time of filing, and/or as developed/made available after the time of filing.

In one embodiment, once, for each identified data security jurisdiction zone of IDENTIFY ONE OR MORE DATA SECURITY JURISDICTION ZONES OPERATION 303, the data security policy data for the data security jurisdiction zone of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 305 is automatically analyzed to determine allowed secrets data with respect to the data security jurisdiction zone at FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307, process flow proceeds to FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309.

In one embodiment at FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309 for each identified data security jurisdiction zone of FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307, allowed secrets data with respect to the data security jurisdiction zone is automatically obtained/collected.

As noted above, in one embodiment, the different types of allowed secrets are provided by, and/or originate from, different secret sources. In one embodiment, the secrets data representing the different classes of secrets are maintained, at least initially, in separate secret databases, systems, or data stores, and/or in a master secrets database. Consequently, in various embodiments, the allowed secrets data with respect to each of the identified data security jurisdiction zones is automatically obtained/collected from various sources such as, but not limited to, a secrets manager system that is associated with a data/resources services center, such as a data center, providing data and/or resources to distributed computing systems, such as cloud-based computing environments and resources.

In one embodiment, the allowed secrets data with respect to each of the identified data security jurisdiction zones automatically obtained/collected at FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309 includes data representing one or more types of allowed secrets used to control access to one or more types of resources associated with the types of secrets by one or more entities, such as a virtual asset.

As noted above, in various embodiments, the data security policy data for the identified data security jurisdiction zones of FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309 includes data indicating allowed encryption levels within the identified data security jurisdiction zones. Consequently, in various embodiments, the allowed secrets data for each data security jurisdiction zone includes allowed encryption key data including at least one encryption key in compliance with the data security policy data for the data security jurisdiction zone.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

In one embodiment once, for each identified data security jurisdiction zone of FOR EACH IDENTIFIED DATA SECURITY JURISDICTION ZONE, AUTOMATICALLY ANALYZE THE DATA SECURITY POLICY DATA FOR THE DATA SECURITY JURISDICTION ZONE TO DETERMINE ALLOWED SECRETS DATA WITH RESPECT TO THE DATA SECURITY JURISDICTION ZONE OPERATION 307, allowed secrets data with respect to the data security jurisdiction zone is automatically obtained/collected at FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309, process flow proceeds to FOR EACH IDENTIFIED DATA SECURITY JURISDICTION ZONE, AUTOMATICALLY TRANSFER THE ALLOWED SECRETS DATA FOR THE DATA SECURITY JURISDICTION ZONE TO AN ALLOWED SECRETS DATA STORE ASSOCIATED WITH THE DATA SECURITY JURISDICTION ZONE OPERATION 311.

In one embodiment once the allowed secrets data with respect to each of the identified data security jurisdiction zones representing one or more allowed secrets is obtained/collected at FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309, the obtained/collected allowed secrets data with respect to each of the identified data security jurisdiction zones is pre-deployed, e.g., transferred to, an allowed secrets data store associated with each respective data security jurisdiction zone at FOR EACH IDENTIFIED DATA SECURITY JURISDICTION ZONE, AUTOMATICALLY TRANSFER THE ALLOWED SECRETS DATA FOR THE DATA SECURITY JURISDICTION ZONE TO AN ALLOWED SECRETS DATA STORE ASSOCIATED WITH THE DATA SECURITY JURISDICTION ZONE OPERATION 311 to await a secrets request from a resource in each respective identified data security jurisdiction zone.

In one embodiment, at FOR EACH IDENTIFIED DATA SECURITY JURISDICTION ZONE, AUTOMATICALLY TRANSFER THE ALLOWED SECRETS DATA FOR THE DATA SECURITY JURISDICTION ZONE TO AN ALLOWED SECRETS DATA STORE ASSOCIATED WITH THE DATA SECURITY JURISDICTION ZONE OPERATION 311 the obtained/collected allowed secrets data with respect to each of the identified data security jurisdiction zones is pre-deployed, e.g., transferred to, an allowed secrets data store associated with each respective data security jurisdiction zone located in the respective data security jurisdiction zone to await a secrets request from a resource in each respective identified data security jurisdiction zone.

In one embodiment, once the obtained/collected allowed secrets data with respect to each of the identified data security jurisdiction zones is pre-deployed, e.g., transferred to, an allowed secrets data store associated with each respective data security jurisdiction zone located in the respective data security jurisdiction zone to await a secrets request from a resource in each respective identified data security jurisdiction zone at FOR EACH IDENTIFIED DATA SECURITY JURISDICTION ZONE, AUTOMATICALLY TRANSFER THE ALLOWED SECRETS DATA FOR THE DATA SECURITY JURISDICTION ZONE TO AN ALLOWED SECRETS DATA STORE ASSOCIATED WITH THE DATA SECURITY JURISDICTION ZONE OPERATION 311, when secrets request data is received representing a request that secrets data be transferred to a first resource, a determination is automatically made as to the data security jurisdiction zone associated with the first resource that is the source of the secrets request data, i.e., a determination is automatically made as to the data security jurisdiction zone of the first resource.

In one embodiment, the determination is automatically made as to the data security jurisdiction zone of the first resource using information contained in the IP address associated with the first resource, and/or any other mechanism as discussed herein, and/or as known in the art at the time of filing, and/or as developed/made available after the time of filing, for determining a data security jurisdiction zone associated with a resource.

In one embodiment, the data security jurisdiction zone of the first resource is determined to be a first data security jurisdiction zone.

In one embodiment, once the data security jurisdiction zone of the first resource is determined to be the first data security jurisdiction zone, the first resource is provided access to the allowed secrets data with respect to the first data security jurisdiction zone pre-deployed to the allowed secrets data store associated with the first data security jurisdiction zone.

In one embodiment once the obtained/collected allowed secrets data with respect to each of the identified data security jurisdiction zones of FOR EACH IDENTIFIED DATA SECURITY JURISDICTION ZONE, AUTOMATICALLY OBTAIN ALLOWED SECRETS DATA WITH RESPECT TO THE DATA SECURITY JURISDICTION ZONE OPERATION 309 is pre-deployed, e.g., transferred to, an allowed secrets data store associated with each respective data security jurisdiction zone at FOR EACH IDENTIFIED DATA SECURITY JURISDICTION ZONE, AUTOMATICALLY TRANSFER THE ALLOWED SECRETS DATA FOR THE DATA SECURITY JURISDICTION ZONE TO AN ALLOWED SECRETS DATA STORE ASSOCIATED WITH THE DATA SECURITY JURISDICTION ZONE OPERATION 311 to await a secrets request from a resource in each respective identified data security jurisdiction zone, process flow proceeds to EXIT OPERATION 330.

In one embodiment, at EXIT OPERATION 330 process 300 for automatically managing secrets in multiple data security jurisdiction zones is exited to await new data.

Using process 300 for automatically managing secrets in multiple data security jurisdiction zones, data security policies associated with various identified data security jurisdiction zones is obtained. Then the data security policy data for each identified data security jurisdiction zone is automatically analyzed to determine allowed secrets data for each data security jurisdiction zone and allowed secrets data is obtained and pre-deployed to allowed secrets data stores associated with each identified data security jurisdiction zone.

Consequently, using process 300 for automatically managing secrets in multiple data security jurisdiction zones, appropriate/allowed secrets for different data security jurisdiction zones are automatically pre-deployed to provide allowed secrets data to resources in the respective data security jurisdiction zones in an efficient and effective manner.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatically managing secrets in a plurality of data security jurisdiction zones comprising:
at least one memory coupled to one or more processors, the at least one memory having stored therein instructions which when executed by any set of the one or more processors, perform a process for automatically managing secrets in the plurality of data security jurisdiction zones, the process for automatically managing secrets in the plurality of data security jurisdiction zones including:
obtaining data security policy data for the plurality of data security jurisdiction zones, the data security policy data for the plurality of data security jurisdiction zones including data indicating allowed secrets data for each respective data security jurisdiction zone of the plurality of data security jurisdiction zones and prohibited secrets data for each respective data security jurisdiction zone of the plurality of data security jurisdiction zones, the allowed secrets data for each respective data security jurisdiction zone representing one or more secrets allowed to be used to protect data in the respective data security jurisdiction zone, the prohibited secrets data for each respective data security jurisdiction zone of the plurality of data security jurisdiction zones representing one or more secrets that are not allowed to be used to protect data in the respective data security jurisdiction zone;
obtaining secrets request data representing a request that secrets data be transferred to a resource;
automatically determining a data security jurisdiction zone of the resource;
automatically obtaining a portion of the data security policy data corresponding to the data security jurisdiction zone of the resource;
automatically analyzing the portion of the data security policy data corresponding to the data security jurisdiction zone of the resource to determine the allowed secrets data with respect to the data security jurisdiction zone of the resource;
identifying one or more secret data classes by classifying the allowed secrets data according to a level of security provided by the allowed secrets data;
obtaining the allowed secrets data within the one or more secret data classes with respect to the data security jurisdiction zone of the resource; and
automatically providing the obtained allowed secrets data with respect to the data security jurisdiction zone of the resource to the resource.

2. The system for automatically managing secrets in the plurality of data security jurisdiction zones of claim 1 wherein at least one of the plurality of data security jurisdiction zones is selected from the group of data security jurisdiction zones consisting of:
a geographic region data security jurisdiction zone;
a political region data security jurisdiction zone;
a security based data security jurisdiction zone;
a computing environment data security jurisdiction zone;
a computing sub-environment data security jurisdiction zone within a computing environment data security jurisdiction zone; and
any combination thereof.

3. The system for automatically managing secrets in the plurality of data security jurisdiction zones of claim 1 wherein the data security policy data for the identified data security jurisdiction zones includes data indicating allowed encryption levels within the identified data security jurisdiction zones.

4. The system for automatically managing secrets in the plurality of data security jurisdiction zones of claim 1 wherein the secrets request data represents a request for encryption key data to be transferred to the resource.

5. The system for automatically managing secrets in the plurality of data security jurisdiction zones of claim 1 wherein the allowed secrets data with respect to the data security jurisdiction zone of the resource is allowed encryption key data including at least one encryption key in compliance with the portion of the data security policy data corresponding to the data security jurisdiction zone of the resource.

6. The system for automatically managing secrets in the plurality of data security jurisdiction zones of claim 5 wherein at least one encryption key represented by the allowed encryption key data is selected from the group of encryption keys consisting of:
a public encryption key;
a private encryption key;
a symmetric encryption key;
an asymmetric encryption key;
a public pre-placed encryption key;
a private pre-placed encryption key;
a 40-bit encryption key;
any length encryption keys;
an authentication encryption key;
a benign encryption key;
a content-encryption key (CEK);
a cryptovariable encryption key;
a derived encryption key;
an electronic encryption key;
an ephemeral encryption key;
a key encryption key (KEK);
a key production encryption key (KPK);
a FIREFLY encryption key;
a master encryption key;
a message encryption key (MEK);
a RED encryption key;
a session encryption key;
a traffic encryption key (TEK);
a transmission security encryption key (TSK);
a seed encryption key;
a signature encryption key;
a stream encryption key;
a Type 1 encryption key;

a Type 2 encryption key;
a Vernam encryption key;
a zeroized encryption key; and
any combination thereof.

7. The system for automatically managing secrets in the plurality of data security jurisdiction zones of claim 1 wherein the allowed secrets data with respect to the data security jurisdiction zone of the resource is automatically transferred to a secrets data store in the data security jurisdiction zone of the resource accessible by the resource.

8. The system for automatically managing secrets in the plurality of data security jurisdiction zones of claim 1 wherein the resource is selected from the group of resources consisting of:
a virtual machine;
a virtual server;
a database or data store;
an instance in a cloud environment;
a cloud environment access system;
part of a mobile device;
part of a remote sensor;
part of a laptop computing system;
part of a desktop computing system;
part of a point-of-sale computing system;
part of an ATM; and
part of an electronic voting machine computing system.

9. The system for automatically managing secrets in the plurality of data security jurisdiction zones of claim 1 wherein the data security policy data for the data security jurisdiction zones is obtained from a data security policy manager.

10. The system for automatically managing secrets in the plurality of data security jurisdiction zones of claim 1 wherein the data security policy data for the data security jurisdiction zones is updated automatically.

11. A system for automatically managing secrets in a plurality of data security jurisdiction zones comprising:
one or more processors; and
at least one memory coupled to the one or more processors, the at least one memory having stored therein instructions which when executed by any set of the one or more processors, perform a process for automatically managing secrets in a plurality of data security jurisdiction zones, the process for automatically managing the secrets in the plurality of data security jurisdiction zones including:
obtaining data security policy data for the plurality of data security jurisdiction zones, the data security policy data for the plurality of data security jurisdiction zones including data indicating allowed secrets data for each respective data security jurisdiction zone of the plurality of data security jurisdiction zones and prohibited secrets data for each respective data security jurisdiction zone of the plurality of data security jurisdiction zones, the allowed secrets data for each respective data security jurisdiction zone representing one or more secrets allowed to be used to protect data in the respective data security jurisdiction zone, the prohibited secrets data for each respective data security jurisdiction zone of the plurality of data security jurisdiction zones representing one or more secrets that are not allowed to be used to protect data in the respective data security jurisdiction zone;
for each data security jurisdiction zone of the plurality of data security jurisdiction zones, automatically analyzing a portion of the data security policy data corresponding to the data security jurisdiction zone to determine the allowed secrets data with respect to the data security jurisdiction zone;
identifying one or more secret data classes by classifying the allowed secrets data according to a level of security provided by the allowed secrets data;
for each data security jurisdiction zone of the plurality of data security jurisdiction zones, automatically obtaining the allowed secrets data within the one or more secret data classes with respect to the data security jurisdiction zone; and
for each data security jurisdiction zone of the plurality of data security jurisdiction zones, automatically pre-deploying the allowed secrets data within the one or more secret data classes for the data security jurisdiction zone to an allowed secrets data store associated with the data security jurisdiction zone.

12. The system for automatically managing secrets in the plurality of data security jurisdiction zones of claim 11 wherein at least one of the plurality of data security jurisdiction zones is selected from the group of data security jurisdiction zones consisting of:
a geographic region data security jurisdiction zone;
a political region data security jurisdiction zone;
a security based data security jurisdiction zone;
a computing environment data security jurisdiction zone;
a computing sub-environment data security jurisdiction zone within a computing environment data security jurisdiction zone; and
any combination thereof.

13. The system for automatically managing secrets in the plurality of data security jurisdiction zones of claim 11 wherein the data security policy data for the data security jurisdiction zones includes data indicating allowed encryption levels within the data security jurisdiction zones.

14. The system for automatically managing secrets in the plurality of data security jurisdiction zones of claim 11 wherein the allowed secrets data is allowed encryption key data including at least one encryption key in compliance with the data security policy data for the data security jurisdiction zones.

15. The system for automatically managing secrets in the plurality of data security jurisdiction zones of claim 14 wherein at least one encryption key represented by the allowed encryption key data is selected from the group of encryption keys consisting of:
a public encryption key;
a private encryption key;
a symmetric encryption key;
an asymmetric encryption key;
a public pre-placed encryption key;
a private pre-placed encryption key;
a 40-bit encryption key;
any length encryption keys;
an authentication encryption key;
a benign encryption key;
a content-encryption key (CEK);
a cryptovariable encryption key;
a derived encryption key;
an electronic encryption key;
an ephemeral encryption key;
a key encryption key (KEK);
a key production encryption key (KPK);
a FIREFLY encryption key;
a master encryption key;
a message encryption key (MEK);
a RED encryption key;

a session encryption key;
a traffic encryption key (TEK);
a transmission security encryption key (TSK);
a seed encryption key;
a signature encryption key;
a stream encryption key;
a Type 1 encryption key;
a Type 2 encryption key;
a Vernam encryption key;
a zeroized encryption key; and
any combination thereof.

16. The system for automatically managing secrets in the plurality of data security jurisdiction zones of claim 11 wherein for each data security jurisdiction zone of the plurality of data security jurisdiction zones the allowed secrets data for the data security jurisdiction zone is automatically pre-deployed to an allowed secrets data store in the data security jurisdiction zone.

17. The system for automatically managing secrets in the plurality of data security jurisdiction zones of claim 11 wherein the data security policy data for the plurality of data security jurisdiction zones is obtained from a data security policy manager.

18. The system for automatically managing secrets in the plurality of data security jurisdiction zones of claim 11 wherein the data security policy data for the plurality of data security jurisdiction zones is updated automatically.

19. A system for automatically managing secrets in a plurality of data security jurisdiction zones comprising:
   one or more processors; and
   at least one memory coupled to the one or more processors, the at least one memory having stored therein instructions which when executed by any set of the one or more processors, perform a process for automatically managing the secrets in the plurality of data security jurisdiction zones, the process for automatically managing the secrets in the plurality of data security jurisdiction zones including:
   obtaining data security policy data for a first data security jurisdiction zone of the plurality of data security jurisdiction zones, the data security policy data for the first data security jurisdiction zone including data indicating allowed secrets data for the first data security jurisdiction zone and prohibited secrets data for the first data security jurisdiction zone, the allowed secrets data for the first data security jurisdiction zone representing one or more secrets allowed to protect data in the first data security jurisdiction zone, the prohibited secrets data for the first data security jurisdiction zone representing one or more secrets that are not allowed to protect data in the first data security jurisdiction zone;
   automatically analyzing the data security policy data for the first data security jurisdiction zone to determine the allowed secrets data with respect to the first data security jurisdiction zone;
   identifying one or more secret data classes by classifying the allowed secrets data according to a level of security provided by the allowed secrets data;
   automatically obtaining the allowed secrets data within the one or more secret data classes with respect to the first data security jurisdiction zone;
   automatically pre-deploying the allowed secrets data within the one or more secret data classes for the first data security jurisdiction zone to an allowed secrets data store associated with the first data security jurisdiction zone;
   obtaining secrets request data representing a request that secrets data be transferred to a first resource;
   automatically determining the first resource is within the first data security jurisdiction zone;
   automatically providing the first resource access to the pre-deployed allowed secrets data in the allowed secrets data store associated with the first data security jurisdiction zone.

20. The system for automatically managing secrets in the plurality of data security jurisdiction zones of claim 19 wherein the first data security jurisdiction zone is selected from the group of data security jurisdiction zones consisting of:
   a geographic region data security jurisdiction zone;
   a political region data security jurisdiction zone;
   a security based data security jurisdiction zone;
   a computing environment data security jurisdiction zone;
   a computing sub-environment data security jurisdiction zone within a computing environment data security jurisdiction zone; and
   any combination thereof.

21. The system for automatically managing secrets in the plurality of data security jurisdiction zones of claim 19 wherein the data security policy data for the first data security jurisdiction zone includes data indicating allowed encryption levels within the first data security jurisdiction zone.

22. The system for automatically managing secrets in the plurality of data security jurisdiction zones of claim 19 wherein the allowed secrets data is allowed encryption key data including at least one encryption key in compliance with the data security policy data for the first data security jurisdiction zone.

23. The system for automatically managing secrets in the plurality of data security jurisdiction zones of claim 22 wherein at least one encryption key represented by the allowed encryption key data is selected from the group of encryption keys consisting of:
   a public encryption key;
   a private encryption key;
   a symmetric encryption key;
   an asymmetric encryption key;
   a public pre-placed encryption key;
   a private pre-placed encryption key;
   a 40-bit encryption key;
   any length encryption keys;
   an authentication encryption key;
   a benign encryption key;
   a content-encryption key (CEK);
   a cryptovariable encryption key;
   a derived encryption key;
   an electronic encryption key;
   an ephemeral encryption key;
   a key encryption key (KEK);
   a key production encryption key (KPK);
   a FIREFLY encryption key;
   a master encryption key;
   a message encryption key (MEK);
   a RED encryption key;
   a session encryption key;
   a traffic encryption key (TEK);
   a transmission security encryption key (TSK);
   a seed encryption key;
   a signature encryption key;
   a stream encryption key;
   a Type 1 encryption key;
   a Type 2 encryption key;

a Vernam encryption key;
a zeroized encryption key; and
any combination thereof.

24. The system for automatically managing secrets in the plurality of data security jurisdiction zones of claim 19 wherein the allowed secrets data for the first data security jurisdiction zone is automatically pre-deployed to an allowed secrets data store in the first data security jurisdiction zone.

25. The system for automatically managing secrets in the plurality of data security jurisdiction zones of claim 19 wherein the data security policy data for the first data security jurisdiction zone is obtained from a data security policy manager.

26. The system for automatically managing secrets in the plurality of data security jurisdiction zones of claim 19 wherein the data security policy data for the first data security jurisdiction zone is updated automatically.

\* \* \* \* \*